United States Patent [19]

Fodor et al.

[11] 4,120,915

[45] Oct. 17, 1978

[54] STYRENE-DIENE$_1$-DIENE$_2$ BLOCK TERPOLYMER WITH IMPROVED THERMAL STABILITY

[75] Inventors: Lawrence M. Fodor; Alonzo G. Kitchen, both of Bartlesville, Okla.

[73] Assignee: Phillips Petroleum Company, Bartlesville, Okla.

[21] Appl. No.: 704,589

[22] Filed: Jul. 12, 1976

[51] Int. Cl.$^2$ ............................................. C08F 297/04
[52] U.S. Cl. ......................... 260/880 B; 260/45.7 PH; 260/45.85 N; 260/45.95 H
[58] Field of Search ..................................... 260/880 B

[56] References Cited

U.S. PATENT DOCUMENTS

| | | | |
|---|---|---|---|
| 3,281,383 | 10/1966 | Zelinski | 260/880 B |
| 3,637,554 | 1/1972 | Childers | 260/880 B |
| 3,639,517 | 2/1972 | Kitchen | 260/880 B |
| 3,639,521 | 2/1972 | Hsieh | 260/880 B |
| 3,840,616 | 10/1974 | Clark | 260/880 B |
| 3,859,250 | 1/1975 | Fodor | 260/880 B |
| 3,959,412 | 5/1976 | Oberlin | 260/880 B |
| 3,985,830 | 10/1976 | Fetters | 526/21 |

*Primary Examiner*—Paul R. Michl

[57] ABSTRACT

A thermally stable resinous block terpolymer is formed by first polymerizing styrene to form a resinous block segment, thereafter forming a block segment of sequentially polymerized isoprene and 1,3-butadiene, and finally coupling the resulting polymer chains with a polyfunctional coupling agent.

12 Claims, 4 Drawing Figures

STYRENE-DIENE$_1$-DIENE$_2$ BLOCK TERPOLYMER WITH IMPROVED THERMAL STABILITY

BACKGROUND OF THE INVENTION

This invention relates to a method of preparing thermally stable resinous block polymers.

Resinous block polymers of styrene and conjugated dienes have been known for some time and are now used commercially in a wide variety of applications. Such polymers have been found useful for various applications including injection molding, extrusion and the like. The conjugated diene portion of these known styrene/diene resinous polymers, while contributing to the overall polymer properties such as impact strength, tends to make the polymers susceptible to thermal instability. It has been found that both styrene/butadiene copolymers and styrene/isoprene copolymers exhibit thermal instability. Accordingly, this limits their usefulness in applications which involve exposure to high temperatures.

SUMMARY OF THE INVENTION

It is an object of this invention to provide a process for producing thermally stable resinous styrene/conjugated diene block polymers.

It is a further object of this invention to provide a thermally stable resinous styrene/conjugated diene block polymer.

According to this invention, thermally stable resinous block terpolymer is formed by first polymerizing styrene to form a resinous block segment, thereafter forming a block of sequentially polymerized isoprene and 1,3-butadiene, and finally coupling the resulting polymer chains with a polyfunctional coupling agent.

BRIEF DESCRIPTION OF THE DRAWINGS

In the drawings, forming a part hereof.

DESCRIPTION OF THE PREFERRED EMBODIMENTS

Figure 1:
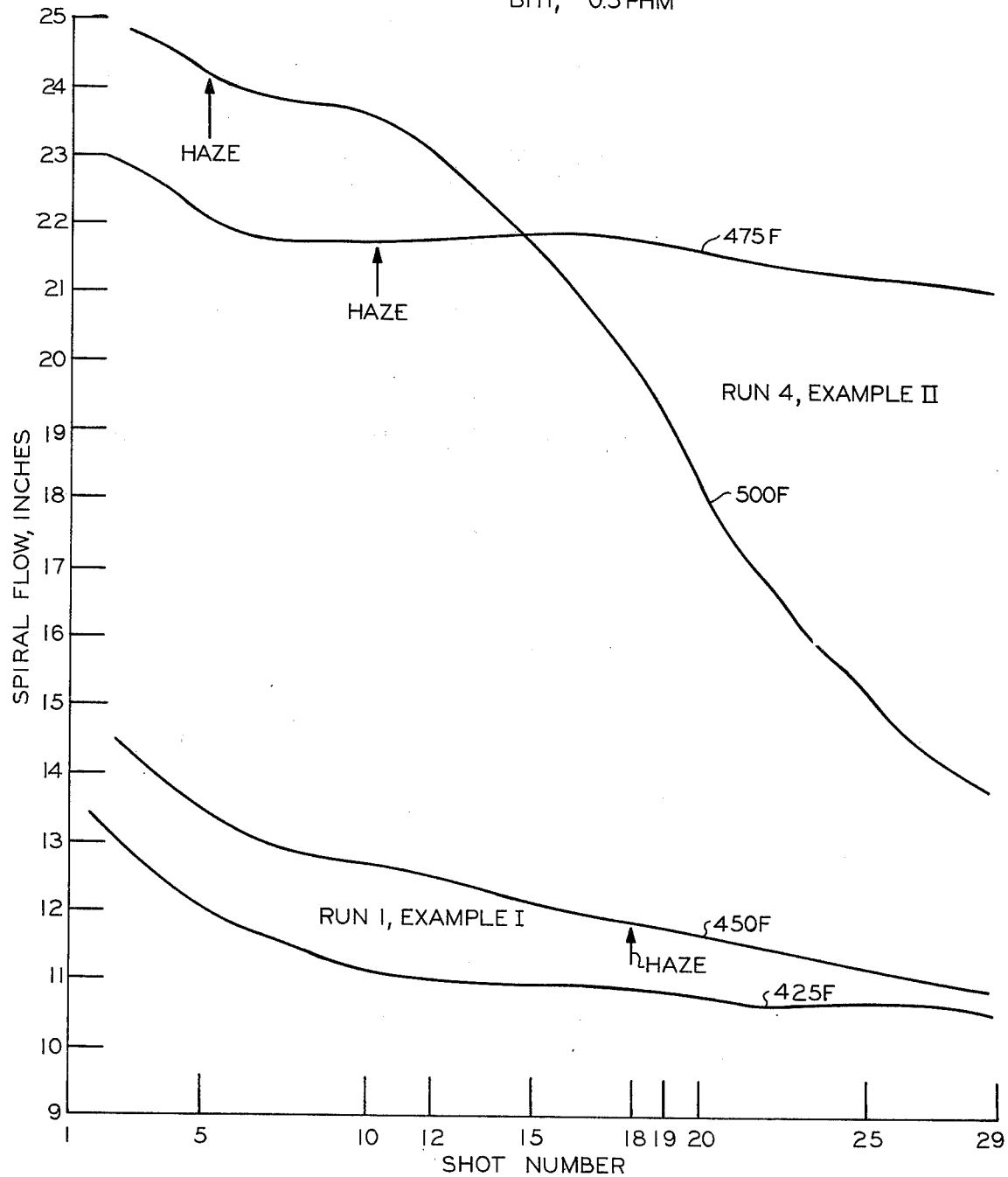
FIG. 1 is a graph showing the high temperature thermal instability of two types of resinous block polymers.

This invention concerns resinous block polymers comprising polymerized styrene, isoprene and 1,3-butadiene produced in a solution process by contact with organolithium initiators such as n-butyllithium. The resulting lithiumterminated products are subsequently coupled by means of polyfunctional treating agents to obtain the final products which are then conventionally recovered. The invention is broadly applicable to either block polymers produced by a single addition of the styrene or block polymers produced by multiple additions of styrene monomer and initiator. The production of such polymers is broadly disclosed in Zelinski et al U.S. Pat. No. 3,821,383, the disclosure of which is hereby incorporated by reference, it being understood that it is only those polymers within the broad scope of Zelinski et al which are resinous to which this invention applies. In order to be resinous the polymers of this invention must be made up of predominantly styrene. Generally, the styrene content will be in the range of 70 to 95 weight percent based on the total weight of styrene, butadiene and isoprene. About 74-78 weight percent styrene is most preferred. The preparation of resinous block polymers prepared by multiple addition of the styrene and initiator is specifically disclosed in Kitchen et al U.S. Pat. No. 3,639,517, the disclosure of which is also incorporated herein by reference.

The instant invention is an improvement over the broad disclosures of said Zelinski et al and Kitchen et al patents in that with the specific monomers styrene, isoprene, and 1,3-butadiene a more thermally stable polymer is produced by polymerizing the rubbery segment of the polymer chains from isoprene and butadiene which are added sequentially, that is, the isoprene is added after the butadiene is substantially polymerized or vice versa.

The invention is applicable to either terpolymers produced by single addition of styrene and initiator or multiple addition of styrene and initiator as set out hereinabove. Thus, prior to coupling the terpolymer can be described in coded form as S-D$_1$-D$_2$ where S refers to the polystyrene block (prepared by either a single addition of styrene and monomer initiator or multiple addition of styrene and initiator), and where D$_1$ and D$_2$ are different and are polymerized butadiene and isoprene. Most preferably, the isoprene is introduced and polymerized prior to the butadiene addition and polymerization. Additional initiator is not added with either the isoprene or the butadiene.

One indication of thermal instability is melt flow change. In this test polymer is subjected to a specified temperature for a period of time with the melt flow being determined both before and after. Ideally the polymer exhibits very little change in melt flow since either crosslinking which results in a decrease in melt flow or visbreaking or thermal cracking of the polymer which results in an increase in melt flow is indicative of polymer which is unsuited for high temperature processing. Both reactions may be occurring simultaneously with the predominating reaction determining whether the molten resin will exhibit decreased flow or increased flow. Another important test to determine thermal stability is the spiral mold test wherein a series of spiral-shaped samples are molded at a given cylinder temperature, other process conditions also being held constant. The change in measured length of each spiral in a given series of consecutive shots from each resin clearly indicates a measure of the thermal stability of the sample. Little or no change in length with prolonged heating indicates a stable resin. A decrease in the spiral length in the series indicates a melt flow dropoff due to crosslinking, i.e., the melt viscosity is increasing with prolonged heating. Conversely, an increase in spiral length in a series indicates the resin is degrading, i.e., the melt viscosity is decreasing with prolonged heating.

The onset of haze in the spiral in a given series is also an indication of thermal stability. An unstable resin shows development of haze earlier in a series than does a more stable resin. The onset of haze generally occurs before the break in a curve showing spiral length versus shot number. Haze development in certain packaging applications is a serious disadvantage.

The injection molding machine used for carrying out the spiral mold test in examples hereinbelow was a New Britain 75B Injection Molder with a no backflow tip, and a pressure operated needle type nozzle. The mold temperature was 100° F. (38° C.), screw speed was 104 rpm, maximum injection speed was used, injection pressure of 18,000 psi (124.1 MPa), holding time 10 seconds, cooling time 20 seconds, and total cycle time 33 seconds.

It is believed that the spiral flow test results may provide a more accurate indication of the thermal stability of a resin than do melt flow change results. In this test the prolonged heating as well as mechanical working are involved rather than the less stringent conditions utilized in determining melt flow changes by means of a melt indexer.

EXAMPLE I

This Example describes polymer made using a single addition of styrene and initiator. These resinous block polymers of styrene and conjugated diene(s) having a weight ratio of styrene to conjugated diene(s) of 76 to 24 were made in a 5 gallon (0.019 m$^3$) stirred reactor according to the following charge order:

Cyclohexane containing 0.025 parts phm THF.
Styrene, first portion.
n-Butyllithium as about a 10 wt. % solution in cyclohexane.
Styrene, second portion.
Styrene, third portion.
Diene one (1,3-butadiene or isoprene or mixture thereof).
Diene two, if used (isoprene or 1,3-butadiene).
Epoxidized soybean oil in cyclohexane (0.50 g oil/cc solvent).
Water, 0.2 phm.
$CO_2$, 0.1 phm.
Antioxidant solution, 2 wt. % antioxidant in cyclohexane.

About 93 wt. % of the total cyclohexane used, containing 0.025 parts by weight tetrahydrofuran (THF) per 100 parts by weight monomer (phm), was preheated to about 100° F. (38° C.) and charged to the reactor. The remaining cyclohexane was consumed as a diluent or flush for the portions of monomers subsequently added to the reactor. Although it is possible to add all the styrene in one portion, if sufficient cooling capacity is provided to control the heat liberated during polymerization, it is presently preferred to add it in three approximately equal portions. This is still within the meaning of single addition since no additional initiator is added. This can better be viewed as simply adding the one increment of styrene slowly. Thus, the heat liberated during the polymerization is more easily controllable and it is possible to limit the peak temperature resulting from each addition below about 180° F. (82° C.) which has been found to be desirable in this process. After charging the cyclohexane, the first styrene portion was added to the reactor and then all the n-butyllithium initiator solution amounting to about 0.10 phm was added. The second and third portions of styrene were subsequently added. Each of the three portions was allowed to polymerize about 10–20 minutes before adding the next monomer charge. The average peak temperature for the runs was 160° F. (75° C.). The diene was charged in one increment for the polymers containing a single block of butadiene or a single block of isoprene or a random butadieneisoprene block. Each diene was charged separately in one increment each for the polymers containing more than one diene block according to this invention. Total polymerization time for the diene(s) amounted to about 20-40 minutes depending upon whether they were added in one portion or two portions. Peak temperatures reached during the diene polymerization averaged about 214° F. (101° C.). Following polymerization of the diene charge and while the polymer solution was still at about 214° F., a solution of epoxidized soybean oil in cyclohexane was added, amounting to 0.5 phm, and allowed to react for about 20 minutes to couple the polymer chains. The solids content in the reactor was about 30–35 percent at this time. The epoxidized soybean oil had a molecular weight of about 1,000 and contained about 4 epoxy groups per formula weight. After the coupling reaction, the polymer solution was contacted with about 0.2 phm water and about 0.1 phm $CO_2$ for about 10 minutes while still at coupling temperature. Thereafter the antioxidant solution was added to the reactor and mixed with the contents. The resin was recovered by heating the contents to about 315°–330° F. and flashing off the solvent.

A description of the quantities of initiator and monomers used, the block sequence for each resin prepared, melt flows of the resins, melt flow change results and spiral flow test results are presented in Table I.

Table I

Thermal Stability of Styrene-Diene Polymers With Variable Isoprene Concentration
All Polymers Contain 76 phm Styrene

| Run No. | NBL phm | Styrene g | Butadiene g | Butadiene phm | Isoprene g | Isoprene phm | Block Sequence[1] Before Coupling | Resin Melt Flow | % Melt Flow Change at 230° C | Spiral Flow Stability - Shot No. of Haze Appearance 425° F (218° C) | Spiral Flow Stability - Shot No. of Haze Appearance 450° F (232° C) | Stabilizer System | Remarks |
|---|---|---|---|---|---|---|---|---|---|---|---|---|---|
| 1 | 0.114 | 2280 | 24 | 24 | 0 | — | S-B | 5.1 | +0.5 | >30 | 18 | A[2] | control |
| 2 | .08 | 1900 | 0 | — | 600 | 24 | S-I | 4.7 | +81.0 | >30 | >30 | A | control |
| 3 | .116 | 1900 | 360 | 14.4 | 240 | 9.6 | S-B/I Random | 3.8 | +13.0 | >30 | 27 | A | control |
| 4 | .116 | 1900 | 480 | 19.2 | 120 | 4.8 | S-B/I Random | 4.9 | +1.5 | >30 | 15 | A | control |
| 5 | .117 | 2280 | 570 | 19.0 | 150 | 5 | S-B-I | 7.2 | +19.5 | >30 | >30 | A | invention |
| 6 | .117 | 2280 | 570 | 19.0 | 150 | 5 | S-I-B | 6.9 | +6.6 | >30 | >30 | A | invention |
| 7 | .114 | 1900 | 600 | 24 | 0 | — | S-B | 4.9 | −24.0 | 12 | 5 | B[3] | control |
| 8 | .117 | 2280 | 420 | 14 | 300 | 10 | S-B-I | 6.4 | +22.0 | >30 | >30 | B | invention |
| 9 | .117 | 2280 | 570 | 19 | 150 | 5 | S-B-I | 6.1 | +14.0 | >30 | 20 | B | invention |
| 10 | .117 | 2280 | 660 | 22 | 60 | 2 | S-B-I | 4.8 | −5.0 | 21 | 7 | B | invention |
| 11 | .10 | 2280 | 570 | 19 | 150 | 5 | S-I-B | 5.7 | +4.5 | nd[4] | 19 | B | invention |

Table I-continued
Thermal Stability of Styrene-Diene Polymers With Variable Isoprene Concentration
All Polymers Contain 76 phm Styrene

| Run No. | NBL phm | Styrene g | Butadiene g | Butadiene phm | Isoprene g | Isoprene phm | Block Sequence[1] Before Coupling | Resin Melt Flow | % Melt Flow Change at 230° C | Spiral Flow Stability - Shot No. of Haze Appearance 425° F (218° C) | Spiral Flow Stability - Shot No. of Haze Appearance 450° F (232° C) | Stabilizer System | Remarks |
|---|---|---|---|---|---|---|---|---|---|---|---|---|---|
| 12 | .115 | 2280 | 570 | 19 | 150 | 5 | S-I-B | 8.8 | +10.1 | nd | 28 | B | invention |

Figure 2:
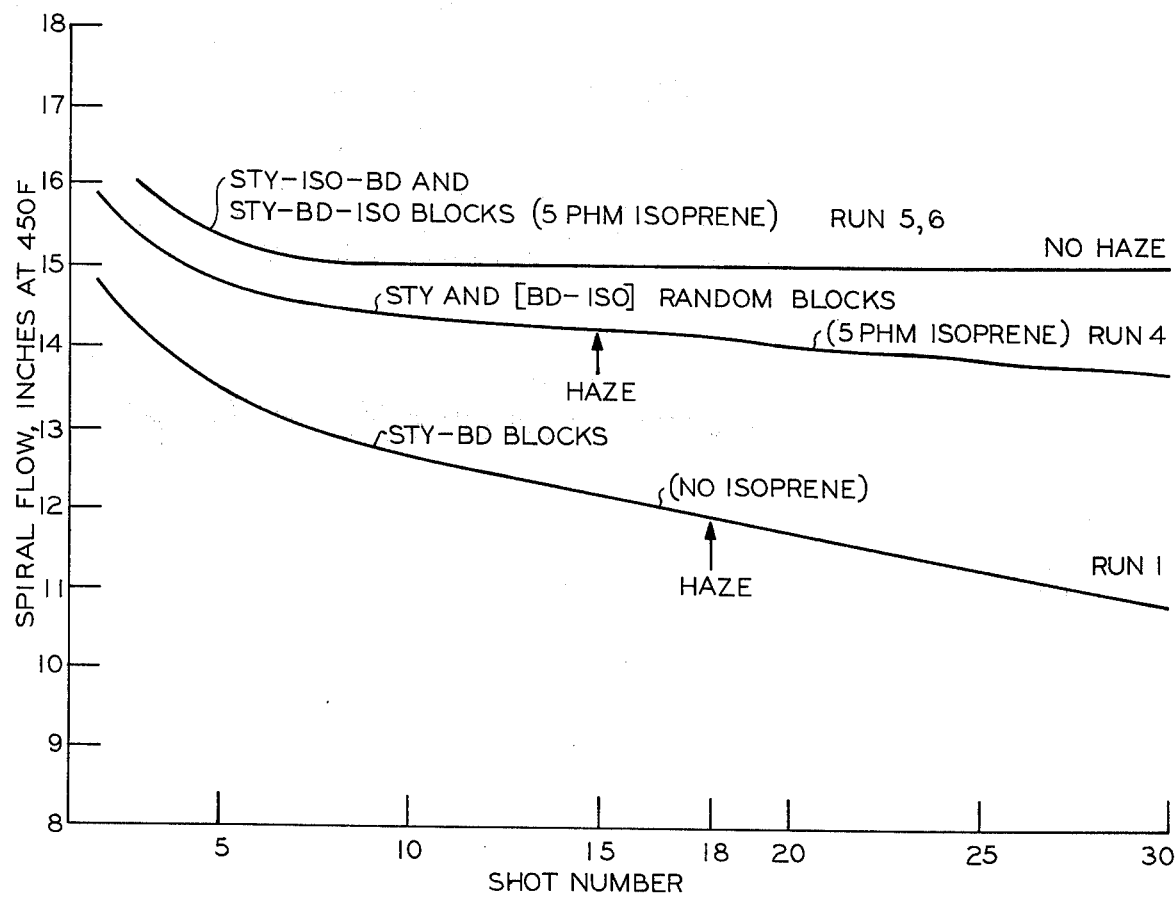
FIG. 2 is a graph comparing the thermal stability of terpolymers produced in accordance with the invention using incremental addition of isoprene and butadiene with terpolymers having a random rubbery isoprene-butadiene block and with polymer containing no isoprene.
Figure 3:
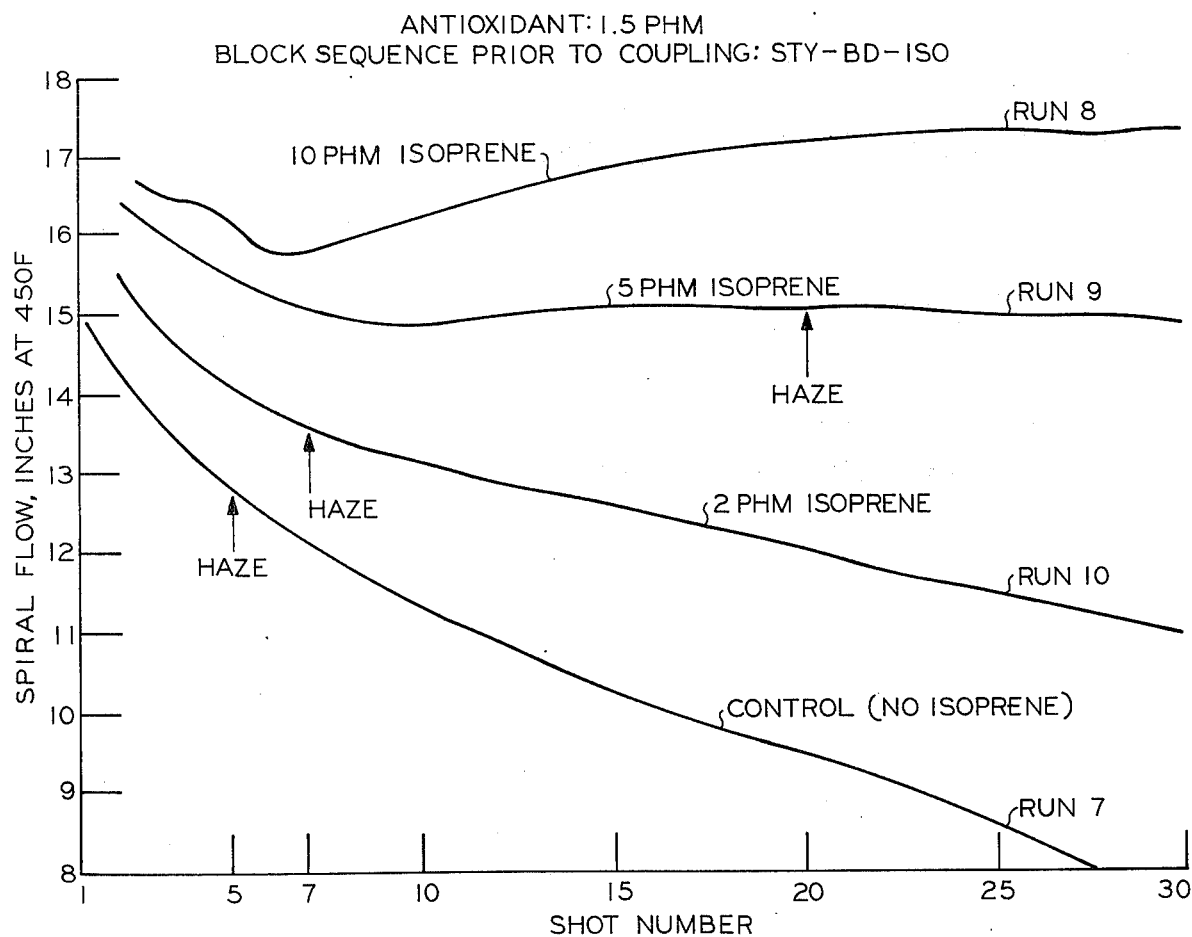
FIG. 3 is a graph showing the effect of varying the ratio of isoprene to butadiene.

[1] S = styrene, B = butadiene, I = isoprene
[2] 1.5 phm TNPP, 0.5 phm BHT
[3] 1.5 phm Geltrol
[4] nd is not determined Samples of the spiral flow test results are also plotted in FIG. 1 for the control resins stabilized with 1.5 phm tris(nonylphenyl) phosphite (TNPP) and 0.5 phm 2,6-di-t-butyl-4-methylphenol (BHT), in FIG. 2 for the invention resins similarly stabilized and in FIG. 3 for invention resins stabilized with 1.5 phm of Geltrol antioxidant. Geltrol is a glycine having the formula

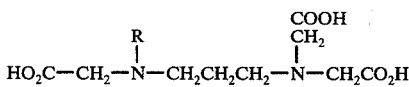

wherein R is either a $C_{14}$, $C_{16}$, or $C_{18}$ alkyl group. An example is: N-octadecyl-N-'-(carboxymethyl)-trimethylene diglycine. These compounds are disclosed in 121.2566 *Federal Register*, Dec. 20, 1969, 34 F.R. 19972, subpart F — Food Additives — pages 62 and 62.1, respectively. While 1.5 phm was used in the Examples in conjunction with about 0.5 phm BHT, it is also possible to use this stabilizer in conjunction with both a stearically hindered phenol and an organic phosphite. In such instances, the glycine will be present in an amount within the range of 1 to 50, preferably 25 to 37 weight percent based on the weight of the phosphite. The total amount of phosphite and glycine in the polymer will be within the range of 0.2 to 5, preferably 0.5 to 2 weight percent of this mixture based on the weight of the polymer. The phenol will be present in an amount within the range of 0.05 to 5, preferably 0.1 to 1, weight percent based on the weight of the polymer.

The data in Table I show styrene-butadiene block copolymer properties in control Runs 1 and 7. The styrene-isoprene block copolymer of Run 2 shows that resins of this type visbreak (degrade) rapidly under sustained high heat which is not desirable. The spiral flow results based on nondevelopment of haze are excellent, however.

Comparing invention resins with similar stabilizer systems, Runs 5 and 6, with polymerized isoprene and butadiene blocks present suggest that such blocks are more important in spiral flow stability as the excellent results shown than when a random butadiene-isoprene block is present as in Runs 3 and 4. FIG. 2 best shows the advantage for the separate sequential addition of the isoprene and butadiene as opposed to the introduction of the dienes in admixture to give a random rubbery block.

With another stabilizer system used, invention Runs 8, 9, 11 and 12 indicate those polymers containing blocks of isoprene and butadiene are clearly superior in stability to the control resin, Run 7. Run 10 is also better in stability than the control resin although the amount of improvement is less than in some of the invention runs.

The curves in FIG. 1 concern only the unmodified control resins. They show that prolonged heat as well as increasing temperature cause a decrease in spiral flow length as the residence time in the injection machine increases. In other words, crosslinking appears to be taking place thus increasing the melt viscosity of the resin being tested with a corresponding decrease in the amount of melt to be injected at constant injection pressure. The resins produced using multiple addition of styrene and initiator are more heat stable and flow easier than do the resins produced with a single addition of styrene and initiator at a similar melt flow.

The curves in FIGS. 2 and 3 clearly illustrate the invention resins to be more heat stable than the control resin both from a haze development standpoint and from a lesser decrease in spiral flow length with increasing residence time in the machine.

Inspection of the curves in FIG. 2 shows at a given isoprene concentration (5 phm), in the polymerized diene segment that a block isoprene/butadiene arrangement provides more heat stability than a random isoprene/butadiene block.

Inspection of the curves in FIG. 3 shows that an isoprene concentration of only 2 phm in a block arrangement provides some improvement in heat stability compared to the unmodified control. At an isoprene concentration of 10 phm in a block arrangement (Run 8) the results show a small initial drop in spiral flow length and then visbreaking begins to predominate and the spiral flow length begins to slowly increase. The results in FIG. 3 suggest that the isoprene concentration should range from about 2 phm to 15 phm, preferably 5-15 phm, based on the spiral flow test. For applications where the melt flow test is a better indicator about 2-15, preferably 2-10, phm should be used.

EXAMPLE II

Polymodal (KR03 type) resinous radial block copolymers of styrene and conjugated diene(s) having a weight ratio of styrene to conjugated diene(s) of 76 to 24 were made in a 5 gallon stirred reactor according to the following charge order:

Cyclohexane containing 0.025 parts phm THF.
Styrene, first portion.
n-Butyllithium solution in cyclohexane, generally about 10 wt. %.
Styrene, second portion.
n-Butyllithium solution, second portion.
Styrene, third portion.
Diene one (1,3-butadiene or isoprene).
Diene two, if used (isoprene or 1,3-butadiene).
Epoxidized soybean oil in cyclohexane (0.50 g oil/cc solvent).
Water, 0.2 phm.

CO₂, 0.1 phm.

Antioxidant solution, as in Example I.

Except for using two portions of initiator, each with an increment of styrene (i.e., true multiple addition of the styrene), the polymerization, water and CO₂ treatments were carried out in the manner of Example I. Thereafter the contents were heated to about 325-335° F. and the resin recovered by flashing off the solvent.

A description of the quantities of initiator and monomers used, the block sequence for each resin prepared, melt flows of the resins, melt flow change results and spiral flow test results are present in Table II.

Figure 4:
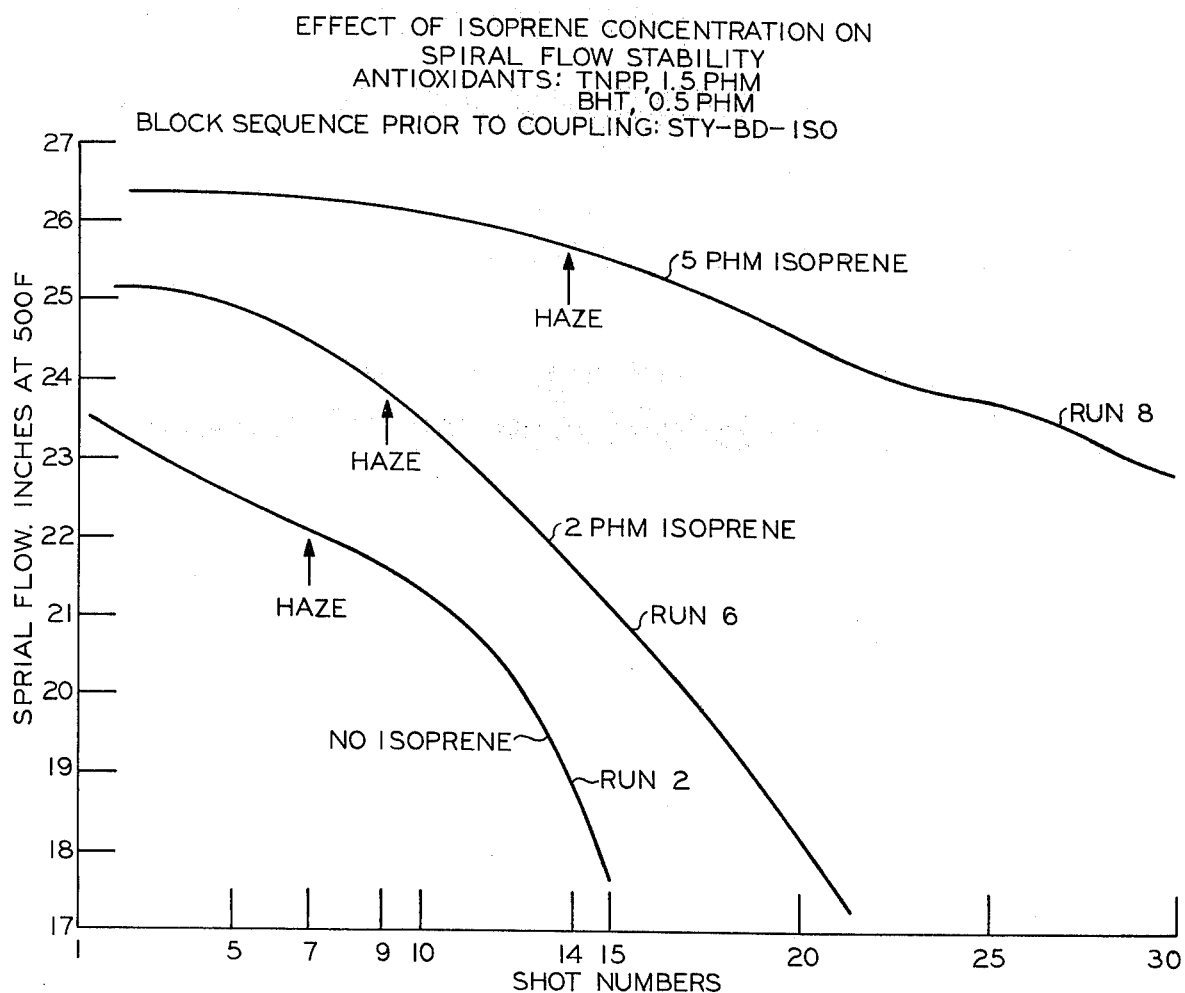
FIG. 4 is a figure similar to FIG. 3 showing the effect of varying the ratio of isoprene in terpolymers wherein the styrene block is produced by sequential addition of monomer and initiator.

In addition, samples of the spiral flow test results are illustrated in FIG. 4.

The trend shown suggests that isoprene, as a block, can be added in the same amount as set out in Example I.

Although heat stability is improved in the resins irrespective of the diene block sequence, in a preferred embodiment, the isoprene block precedes the butadiene block to permit somewhat greater efficiency in the coupling reaction.

While this invention has been described in detail for the purpose of illustration, it is not to be construed as limited thereby but is intended to cover all changes and modifications within the spirit and scope thereof.

We claim:

Table II

Thermal Stability of Polymodal Styrene Radial Block Copolymers With Variable Isoprene Concentration
All Polymers Contain 76 PHM Styrene

| Run No. | Styrene Wt. % | NBL phm | Styrene Wt. % | NBL phm | Total Styrene, g | Butadiene g | Butadiene phm | Isoprene g | Isoprene phm | Diene Block Sequence Before Coupling[1] | Resin Melt Flow 230° C | % Melt Flow Change at 230° C | Spiral Flow Stability Shot No. of Haze Appearance 450° F (232° C) | 475° F (246° C) | 500° F (260° C) | Stabilizer System | Remarks |
|---|---|---|---|---|---|---|---|---|---|---|---|---|---|---|---|---|---|
| 1 | 69.7 | 0.030 | 30.3 | 0.110 | 1900 | 600 | 24 | 0 | — | S-B | 3.7 | +11.5 | nd[2] | >30 | nd | A[3] | control |
| 2 | 69.7 | .033 | 30.3 | .120 | 2280 | 720 | 24 | 0 | — | S-B | 5.5 | −0.2 | nd | nd | 7 | A | control |
| 3 | 69.7 | .030 | 30.3 | .130 | 2280 | 720 | 24 | 0 | — | S-B | 5.6 | +14.6 | nd | 19 | 9 | A | control |
| 4 | 69.7 | .030 | 30.3 | .120 | 2280 | 720 | 24 | 0 | — | S-B | 5.6 | −4.3 | nd | 12 | 5 | A | control |
| 5 | 69.7 | .032 | 30.3 | .115 | 2280 | 720 | 24 | 0 | — | S-B | 3.9 | −1.9 | >30 | 8 | nd | A | control |
| 6 | 69.7 | .030 | 30.3 | .096 | 2280 | 660 | 22 | 60 | 2 | S-B-I | 4.4 | +15.7 | nd | 22 | 9 | A | invention |
| 7 | 69.7 | .030 | 30.3 | .115 | 2280 | 660 | 22 | 60 | 2 | S-B-I | 4.0 | +10.4 | >30 | >30 | nd | A | invention |
| 8 | 69.7 | .030 | 30.3 | .095 | 2280 | 570 | 19 | 150 | 5 | S-B-I | 4.8 | +19.2 | nd | >30 | 14 | A | invention |
| 9 | 69.7 | .035 | 30.3 | .110 | 2280 | 570 | 19 | 150 | 5 | S-B-I | 6.2 | +21.8 | >30 | >30 | nd | A | invention |
| 10 | 69.7 | .030 | 30.3 | .115 | 2280 | 570 | 19 | 150 | 5 | S-B-I | 7.4 | +21.6 | >30 | >30 | nd | A | invention |
| 11 | 69.7 | .028 | 30.3 | .110 | 2280 | 570 | 19 | 150 | 5 | S-I-B | 5.2 | +5.7 | nd | nd | 9 | A | invention |
| 12 | 69.7 | .030 | 30.3 | .110 | 2280 | 570 | 19 | 150 | 5 | S-I-B | 5.7 | +7.2 | nd | nd | 8 | A | invention |
| 13 | 69.7 | .030 | 30.3 | .120 | 2280 | 570 | 19 | 150 | 5 | S-I-B | 5.5 | +9.1 | nd | >30 | 10 | A | invention |
| 14 | 69.7 | .030 | 30.3 | .120 | 2280 | 720 | 24 | 0 | — | S-B | 5.6 | −5.5 | nd | nd | 5 | B1[4] | control |
| 15 | 69.7 | .030 | 30.3 | .110 | 2280 | 570 | 19 | 150 | 5 | S-B-I | 4.9 | +16.9 | nd | nd | 17 | B1 | invention |
| 16 | 69.7 | .030 | 30.3 | .110 | 2280 | 570 | 19 | 150 | 5 | S-I-B | 4.2 | +4.8 | nd | nd | 6 | B2[5] | invention |
| 17 | 69.7 | .030 | 30.3 | .110 | 2280 | 570 | 19 | 150 | 5 | S-I-B | 6.9 | +11.0 | nd | nd | 9 | B2 | invention |

[1] S = styrene, B = butadiene, I = isoprene
[2] nd is not determined
[3] 1.5 phm TNPP, 0.5 phm BHT
[4] 1.35 phm Geltrol
[5] 1.5 phm Geltrol The data in Table II are somewhat scattered, part of this being a result of sample preparation and testing over a period of more than a year. A rigorous comparison is not possible in some instances due to a lack of proper controls in a given time period. The control resin of Run 1 appears to be out of place in comparison to later controls and since no invention resins were made at about the same time it appears reasonable to ignore Run 1 when comparing the invention and control runs.

However, control Runs 2 and 3 can be compared with invention Runs 6 and 8. The results indicate that the resin of invention Run 6 containing 2 phm isoprene as a block is somewhat better than the control runs based on slightly better spiral flow test results. This is more clearly shown in FIG. 4. The invention resin of Run 8 containing 5 phm isoprene as a block is clearly superior in heat stability to the control resin as is shown in both FIG. 4 results and Table II results.

A comparison between the control resin of Run 5 and the invention resins of Runs 7, 9 and 10 can also be fairly made. The results clearly show the superior heat stability of the invention resins.

Similarly, the control resin of Run 4 is not as heat stable as the invention resin of Run 13.

Also, the control resin of Run 14 is not as heat stable as the invention resin of Run 15.

1. A process for producing an antioxidant-containing thermally stable resinous polymer of styrene, 1,3-butadiene and isoprene, said polymer having 70-95 weight percent of said styrene based on a total weight of said styrene, butadiene, and isoprene, said isoprene being present in an amount within the range of 2-15 parts per 100 parts of said styrene, butadiene, and isoprene, said process comprising:

(1) forming said polymer by contacting said styrene with an organolithium initiator under polymerization conditions and effecting polymerization thereof; thereafter sequentially adding and polymerizing said isoprene and said 1,3-butadiene; and thereafter introducing a polyfunctional coupling agent to form a coupling polymer;

(2) adding the antioxidant to the coupled polymer; and (3) recovering the coupled polymer.

2. A method according to claim 1 wherein said isoprene is added before said butadiene.

3. A method according to claim 1 wherein said butadiene is added before said isoprene.

4. A method according to claim 1 wherein said styrene is added in two or more increments with initiator being added along with each increment.

5. A method according to claim 1 wherein said styrene is present in an amount within the range of 74 to 78 weight percent.

6. A method according to claim 1 wherein said polyfunctional coupling agent is epoxidized soybean oil.

7. A method according to claim 1 wherein said organolithium initiator is n-butyllithium.

8. The product produced by the method of claim 1.

9. A process for producing a thermally stable polymer containing an antioxidant, said polymer being a polymer of styrene, 1,3-butadiene and isoprene, said polymer having 70-95 weight percent of said styrene based on a total weight of said styrene, 1,3-butadiene and isoprene, said isoprene being present in an amount within the range of 2-15 parts per 100 parts of said styrene, 1,3-butadiene and isoprene, said process comprising:

contacting said styrene with an organolithium initiator under polymerization conditions and effecting polymerization thereof;

thereafter sequentially adding and polymerizing said isoprene and said 1,3-butadiene;

thereafter introducing a polyfunctional coupling agent; and thereafter recovering the thus coupled polymer and introducing said antioxidant, said antioxidant consisting of a mixture of tris(nonylphenyl) phosphite and 2,6-di-t-butyl-4-methylphenol.

10. A process for producing a thermally stable polymer containing an antioxidant, said polymer being a polymer of styrene, 1,3-butadiene and isoprene, said polymer having 70-95 weight percent of said styrene based on a total weight of said styrene, 1,3-butadiene and isoprene, said isoprene being present in an amount within the range of 2-15 parts per 100 parts of said styrene, 1,3-butadiene and isoprene, said process comprising:

contacting said styrene with an organolithium initiator under polymerization conditions and effecting polymerization thereof;

thereafter sequentially adding and polymerizing said isoprene and said 1,3-butadiene;

thereafter introducing a polyfunctional coupling agent; and thereafter recovering the thus coupled polymer and introducing said antioxidant, said antioxidant being a glycine having the formula

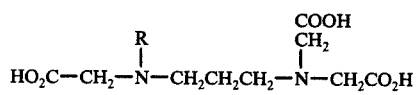

wherein R is either a $C_{14}$, $C_{16}$, or $C_{18}$ alkyl group.

11. A process for producing a thermally stable resinous polymer containing an antioxidant, said polymer being a polymer of styrene, 1,3-butadiene, and isoprene, said polymer having about 76 parts by weight of said styrene per 100 parts by weight of total styrene, 1,3-butadiene and isoprene, said isoprene being present in an amount within the range of 2-15 parts per 100 parts of said styrene, 1,3-butadiene and isoprene, said process comprising:

contacting said styrene with an organolithium initiator under polymerization conditions and effecting polymerization thereof, said styrene being added in two increments with additional initiator being added along with the second increment;

thereafter sequentially adding and polymerizing said isoprene and said 1,3-butadiene, said isoprene being added before said 1,3-butadiene;

thereafter introducing as a polyfunctional coupling agent epoxidized soybean oil having about 4 epoxy groups per formula weight; and thereafter recovering the thus coupled polymer and introducing said antioxidant which is selected from the group consisting of (a) a mixture of tris(nonylphenyl) phosphite and 2,6-di-t-butyl-4-methylphenol and (b) a glycine having the formula

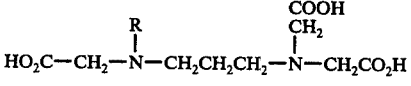

wherein R is either a $C_{14}$, $C_{16}$, or $C_{18}$ alkyl group.

12. A product produced by the method of claim 11.

* * * * *